United States Patent [19]

Omente et al.

[11] Patent Number: 5,767,177
[45] Date of Patent: Jun. 16, 1998

[54] INJECTION MOULDABLE THERMOSETTING COMPOSITION ESPECIALLY FOR MOTOR VEHICLE BODIES, METHOD OF PRODUCTION AND METHOD OR RECYCLING

[75] Inventors: Pedro Omente, Evin Malmaison; Lionel Landru, Eleu Dit Leauwette, both of France

[73] Assignee: Cytec Industry Incorporated, West Paterson, N.J.

[21] Appl. No.: 537,824

[22] PCT Filed: May 2, 1994

[86] PCT No.: PCT/FR94/00500

§ 371 Date: Apr. 1, 1996

§ 102(e) Date: Apr. 1, 1996

[87] PCT Pub. No.: WO94/25528

PCT Pub. Date: Nov. 10, 1994

[30] Foreign Application Priority Data

May 4, 1993 [FR] France .................... 93 05293

[51] Int. Cl.⁶ .................... C08L 63/10; C08L 67/06; C08L 75/16
[52] U.S. Cl. .................... 523/447; 523/457; 523/466; 523/468; 523/509; 523/514; 523/527; 524/35; 524/425; 524/590
[58] Field of Search .................... 523/447, 509, 523/457, 466, 468, 514, 527; 524/35, 425, 590

[56] References Cited

U.S. PATENT DOCUMENTS

| 3,991,005 | 11/1976 | Wallace | 523/129 |
| 4,067,845 | 1/1978 | Epel | 523/527 |
| 5,231,121 | 7/1993 | Kramer | 523/509 |

FOREIGN PATENT DOCUMENTS

| 662820 | 8/1965 | Belgium | C08L 67/06 |
| 498060 | 8/1992 | European Pat. Off. | C08L 67/06 |
| 2334716 | 7/1977 | France | C08L 67/06 |
| 2256968 | 5/1973 | Germany | C09K 11/00 |
| 2103639 | 2/1983 | United Kingdom | C08L 67/06 |

*Primary Examiner*—Patricia A. Short
*Attorney, Agent, or Firm*—Graham & James LLP

[57] ABSTRACT

Thermosetting composition. According to the invention, it comprises approximately, by weight:

33% to 43% of a thermosetting resin;

5% to 15% cellulose fibers;

15% to 21% mineral fillers;

12.5% to 22.5% reinforcement fibers of high mechanical strength.

10 Claims, No Drawings

INJECTION MOULDABLE THERMOSETTING COMPOSITION ESPECIALLY FOR MOTOR VEHICLE BODIES, METHOD OF PRODUCTION AND METHOD OR RECYCLING

The present invention relates to a thermosetting composition which can be used, in particular, for the manufacture of motor vehicle body parts, a process for the obtaining of said composition, as well as a process for recycling parts made of said composition.

Motor vehicle body parts are already being made at present of thermosetting materials of the BMC (bulk molding compound) type. These materials conventionally contain about 50% mineral filler, such as chalk or alumina, and about 20% glass fibers, the balance being formed of a polyester resin. Such a composition leads to a density of about 1.8.

These known thermosetting compositions have a number of drawbacks.

First of all, they are of relatively high density, so that the parts which are made from these materials are heavier than the same parts made of sheet metal for a given mechanical strength.

Furthermore, the recycling of these parts presents real difficulties. In fact, they frequently cannot be burned due to their content of halogen compounds such as chlorine and bromine.

The present invention is directed at overcoming these drawbacks.

For this purpose, the object of the invention is first of all a thermosetting composition which is characterized by the fact that it comprises approximately, by weight:

33% to 43% of a thermosetting resin;
5% to 15% cellulose fibers;
15% to 21% mineral fillers;
12.5% to 22.5% of reinforcement fibers of high mechanical strength.

Such a composition therefore contains much less mineral filler than the known compositions, in particular the bulk molding compounds.

More particularly, the composition of the invention can comprise about 10% cellulose fibers.

The thermosetting resin can be selected from among polyesters having a maleic, orthophthalic, isophthalic or adipic base, or vinyl esters having a urethane or epoxy base.

The reinforcement fibers can be selected, in particular, at least in part, from among glass, carbon or aramid fibers, such as those sold under the trademark Kevlar by Dupont de Nemours.

The mineral fillers may furthermore be selected at least in part from among calcium carbonate and hydrated alumina.

The composition of the invention can furthermore comprise about 15% to 25% by weight of anti-shrinkage additive.

One composition in accordance with the invention which is particularly advantageous for the production of motor vehicle body parts comprises, by weight, about 30% resin, 20% of an anti-shrinkage additive, 0.5% catalyst, 10% cellulose fibers, 18% mineral fillers, 2% of a mold-release agent, and 17.5% of reinforcement fibers of high mechanical strength.

These reinforcement fibers may more particularly comprise aramid fibers, for instance Kevlar, in an amount of from 1% to 3% of the total weight.

The present invention also has as its object a process for the obtaining of a thermosetting composition such as described above in which, the mineral fillers and the fibers, solids, on the one hand, and on the other hand the other components, liquids, are first of all separately mixed and thereupon the solid mixture is impregnated by the liquid mixture.

The present invention also has as its object a process for the recycling of a part made from a composition such as described above in which said part is burned and the ashes are used as fillers in a new thermosetting composition.

The density of the compositions in accordance with the invention is on the order of 1.3, so that the molded parts of this composition are considerably lighter than the equivalent parts molded from the conventional bulk molding compounds.

This lightness is obtained by the cellulose fibers, which may be of different origin (wood, cotton, sisal, etc.) and of different lengths (a few microns to several millimeters).

Furthermore, as the cellulose fibers absorb a large amount of resin, the latter is present in a stronger proportion than in the conventional bulk molding compounds, which contributes to an improvement in the mechanical properties, which, as will be seen below, are far superior to those of the conventional bulk molding compounds.

Finally, the use of the compositions of the invention does not have recourse to a maturing (salification), which is also contrary to the bulk molding compounds.

One particular non-limitative embodiment of the invention will now be described by way of illustration.

The following Table 1 gives ranges of percentages by weight of the different components of compositions according to the invention.

TABLE I

| THERMOSETTING RESINS | |
|---|---|
| polyester | |
|   maleic | |
|   orthophthalic | |
|   isophthalic | |
|   adipic | 38% ± 5% |
| vinyl ester | |
|   urethane | |
|   epoxy | |
| ANTI-SHRINKAGE ADDITIVES | |
| polyvinyl acetate | |
| polystyrene | |
| elastomers | 20 ± 5% |
| polymethylmethacrylate | |
| CATALYST | |
| peroxide | 0.5% |
| CELLULOSE FIBERS | |
| wood | |
| cotton | 10% ± 5% |
| sisal | |
| MINERAL FILLERS | |
| calcium carbonate | 18% ± 3% |
| hydrated alumina | |
| MOLD-RELEASE AGENT | |
| calcium stearate | |
| wax | 2% |
| REINFORCEMENT FIBERS | |
| glass | |
| carbon | 17.5% ± 5% |
| Kevlar | |

It will be noted that none of the resins used contains a halogen component, so that the combustion of parts made of these compositions does not have any drawback from the standpoint of the environment.

The anti-shrinkage additives, catalysts, mineral fillers, mold-release agents and reinforcement fibers of high mechanical strength indicated here are indicated merely by way of illustration and not of limitation, and other components already known to have these properties can be used. The same applies with respect to the thermosetting resins.

Furthermore, fiber, cotton or sisal has been indicated here as possible source of cellulose fibers, but fibers of other origin can be used.

Table 2 below indicates the physical, mechanical and electrical properties of molded parts in four materials having the following compositions:

Orthophthalic resin (8532 of Reichold) or vinyl acetate resin (470 of Dow Chemical) ... 38%

Anti-shrinkage agent (XP 220 and XP 504 of Maestra ... 20%

Catalyst (terbutyl peroctoate and terbutyl perbenzoate) ... 0.5%

Mineral fillers (mixture of hydrated alumina and calcium carbonate) ... 18%

Mold-release agent (calcium stearate) ... 2%

Reinforcement fibers (glass) ... 17.5%

The materials in accordance with the invention can be obtained in a series of steps by means of two mixers.

A first ribbon mixer makes it possible to produce a homogeneous mixture of the different mineral fillers, cellulose fibers, and glass fibers, the outlet of this mixer is directly connected to the second mixer.

This second Z-arm mixer serves, first of all, for the mixing of the different liquid components (resins, catalysts, colorants, etc.). It then serves for the final operation which consists of impregnating the mixture of the solid elements with the liquid mixture.

By way of example, the first mixer, the ribbon mixer, has a capacity of 1200 liters and is filled with 300 kg of solids. These materials are mixed therein for a minute to a minute and a half at 42 rpm.

The second mixer, the Z-arm mixer, also has a capacity of 1200 liters, and also operates at 42 rpm. The mixing of the liquid components lasts about 10 minutes and the impregnating of the solid components lasts 4 to 6 minutes, depending on the percentage of glass fibers.

The recycling of the molded parts of such material can be effected by means of a furnace of a power on the order of 5 kw, a hammer crusher of a power of about 2.2 kw, and a vibratory screen having, for instance, a diameter on the order of 650 mm, a mesh of 2 mm, and a power of about 2.2 kw.

TABLE 2

| CHARACTERISTICS | UNIT | METHOD | A | B | C | D |
|---|---|---|---|---|---|---|
| PHYSICAL | | | | | | |
| Specific gravity | g/cm$^3$ | Picnometer | 1.33 | 1.40 | 1.27 | 1.33 |
| Shrinkage | % | | 0 | 0 | 0 | 0 |
| Water absorption | mg/ | NFT 51002 | 30 | 26 | 34 | 34 |
| MECHANICAL | | | | | | |
| Breaking stress in flexure | MPa | ISO R 527 | 140 | 120 | 152 | 212 |
| Modulus of flexure | MPa | ISO R 527 | 13000 | 11000 | 13000 | 13000 |
| Impact strength | KJ/m$^2$ | ISO 178 | 22 | 18 | 25 | 32 |
| ELECTRICAL | | | | | | |
| Transverse resistivity | Log10 | NFC 26215 | 10$^{12}$ | 10$^{12}$ | 10$^{11}$ | 10$^{13}$ |
| Surface resistivity | Log10 | NFC 26215 | 10$^{12}$ | 10$^{12}$ | 10$^{12}$ | 10$^{13}$ |
| Dielectric strength (at 90° C.) | KV/mm | NFC 26225 | 12 | 12 | 12 | 14 |

Compositions A and B comprise 10% cotton fibers, composition B 5% and composition C 15%. Furthermore, composition D comprises 2% of Kevlar fibers.

It will be noted that the cellulose fibers make it possible to lower the density substantially as compared with the conventional bulk molding compounds.

The mechanical properties and, in particular, the breaking stress in flexure lie, in accordance with the formulations between 120 and 212 MPa, while the conventional bulk molding compound polyester filled with 18% glass fibers has a value of only 80–100 MPa. The impact strengths are, depending on the formulas, from 18 to 32 kJ/m$^2$, while the conventional polyester bulk molding compound is between 15 and 20 kJ/m$^2$. Finally, the moduli of flexure between 11.000 and 13.000 MPa are directly related to the coefficient of cracking of the different resins used, which explains why the properties are relatively less improved with respect to those of the conventional bulk molding compounds.

It will also be noted that the impact strengths can be improved by a higher content of glass fibers, it being understood that each additional percentage increases the density by 0.02. By way of example, formula a with 17.5% of glass fibers has a density of 1.33 as compared with 1.383 for the same formula a with 20% glass fibers.

The furnace makes it possible to effect the combustion of the parts to be recycled, the hammer crusher to break up the blocks of ash, and the vibratory screen to separate the glass fibers from the chalk in these crushed ashes.

The material is burned between 500 and 580 degrees C due to the fact that it contains very little non-combustible material (about 30%) and behaves upon combustion in the manner of wood charcoal.

As a variant, the combustion can be effected in a coal-fed power plant, and the ash can then be recovered for the processing of new composites or be stored on a slag pile or dump for highway work (embankments, roads, etc.). These ashes, since they are formed of pulverized chalk and micronized glass, are not harmful to the environment nor, in particular, to the groundwater table.

The combustion gases comprise steam, carbon dioxide and carbon monoxide. The ratio of carbon dioxide to carbon monoxide is 95:5. It is important to note the absence of sulfur dioxide and of toxic gases (chlorine, bromine, etc.).

After crushing, the ash may be used again directly in formulations of composite materials as mechanical or other reinforcement fillers.

After crushing, these ashes may also be separated by electric screening into two phases.

During the first phase, the pulverulent ashes composed of 95% calcium carbonate and 5% micronized glass are recycled as mineral fillers in composite materials in order to lower the cost price. During the second phase, the crushed glass fibers separated 100% serve as mechanical reinforcement of formulations, of composition in accordance with the invention or other compositions.

We claim:

1. An injection-moldable thermosetting composition characterized by the fact that it comprises, by weight, about:

33% to 43% of a thermosetting resin in the liquid state;
   5% to 15% cellulose fibers;
   15% to 21% mineral fillers;
   12.5% to 22.5% reinforcement fibers of high mechanical strength.

2. A composition according to claim 1, comprising about 10% cellulose fibers.

3. A composition according to claim 1, in which the thermosetting resin is selected from the group consisting of polyesters having a maleic base, polyesters having an orthophthalic base, polyesters having an isophthalic base, polyesters having an adipic base, vinyl esters having an urethane base, and vinyl esters having an epoxy base.

4. A composition according to claim 1, in which the reinforcement fibers are selected at least in part from members of the group consisting of glass, carbon and aramid fibers.

5. A composition according to claim 1, in which the mineral fillers are selected at least in part, from members of the group consisting of calcium carbonate and alumina.

6. A composition according to any of claim 1, comprising about 15% to 25% by weight of anti-shrinkage additives.

7. A composition according to claim 1, comprising about 38% resin, 20% of an anti-shrinkage additive, 0.5% catalyst, 10% cellulose fibers, 18% mineral fillers, 2% of a mold-release agent, and 17.5% of reinforcement fibers.

8. A composition according to claim 1, in which the reinforcement fibers comprise aramid fibers in an amount of from 1% to 3% of the total weight.

9. A process for preparing the thermosetting composition of claim 1, from the components thereof, said method comprising the steps of:

a) separately mixing the mineral fillers, cellulose fibers and reinforcement fibers as a mixture of solids; and b) impregnating the mixture of solids with the thermosetting resin in the liquid state.

10. The process of claim 9, wherein the thermosetting composition is burned to form ashes and when the ashes are used as the mixture of solids, in the formation of additional thermosetting composition.

* * * * *